United States Patent Office 3,456,226
Patented July 15, 1969

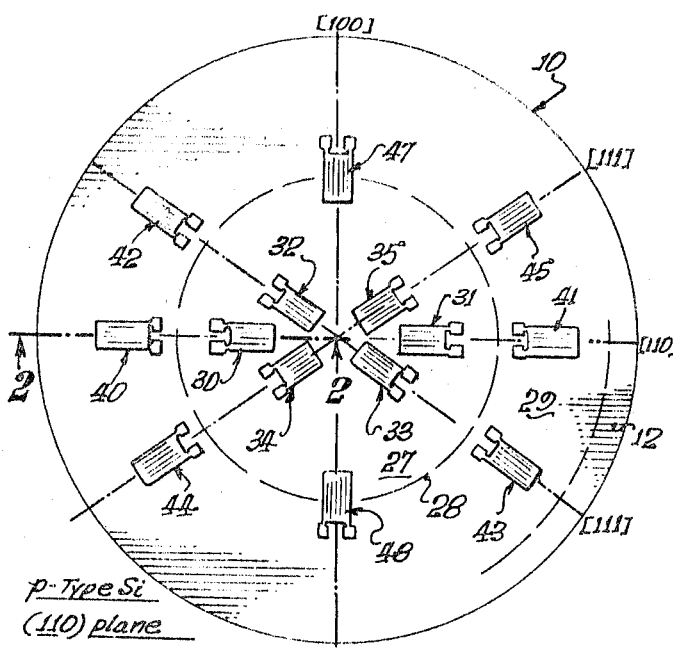

3,456,226
STRAIN GAGE CONFIGURATION
Gerald L. Vick, La Verne, Calif., assignor to Conrac Corporation, New York, N.Y., a corporation of New York
Filed Oct. 27, 1967, Ser. No. 678,728
Int. Cl. G01l 1/22, 9/04
U.S. Cl. 338—2                                               7 Claims

ABSTRACT OF THE DISCLOSURE

The effectiveness of force transducers employing silicon piezoresistive strain gage elements produced in situ on the surface of a diaphragm from a single crystal layer of n- or p-type silicon is improved by orienting the layer with respect to the crystal axes so that it contains two or more directions of maximum longitudinal piezoresistive response; and forming strain gage elements along diameters parallel to both or all such directions.

The invention effectively doubles the conventional number of strain gage elements that can be formed on the surface of a small diaphragm, permitting dissipation of more energy and production of a stronger signal, or, alternatively, providing useful redundancy from which the most efficient or best matched elements may be selected for electrical connection in the finished force or pressure transducer.

---

This invention has to do generally with piezoresistive force transducers that utilize a plurality of piezoresistive strain gage elements formed in situ in a thin layer of suitably doped crystalline silicon on a surface of a slightly flexible diaphragm of closely similar material. Such transducers are useful for measuring forces whether produced mechanically, by fluid pressure, or otherwise.

The invention concerns more particularly improved placement of such strain gage elements on the diaphragm surface.

A primary object of the invention is to increase the number of such resistance elements that can be provided on a diaphragm of given limited dimensions.

A further object of the invention is to utilize more fully the area of a diaphragm, permitting greater energy dissipation and increased signal power.

Further objects and advantages of the invention will appear from the following description of certain preferred embodiments which are illustrative of the invention. The particulars of that description, and of the accompanying drawings which form a part of it, are intended only as illustration and not as a limitation upon the scope of the invention, which is defined in the appended claims.

In the drawings:

FIG. 1 is a schematic plan representing an illustrative configuration in accordance with the invention;

FIG. 2 is a fragmentary axial section on line 2—2 of FIG. 1;

FIG. 3 is a plan at enlarged scale corresponding to a portion of FIG. 1;

FIG. 4 is a schematic plan representing a further illustrative configuration; and FIGS. 5, 6 and 7 are schematic plans representing further illustrative configurations.

When a flexible diaphragm is rigidly supported at its periphery and a transverse force is applied centrally to one face, the flexure strain of the diaphragm produces two concentric zones of opposite curvature. Hence a strain gage element mounted on one face of the diaphragm with its sensitive axis oriented radially will produce a signal of one polarity when mounted in one zone and of the other polarity when mounted in the other zone. It is common practice to place four such piezoresistive elements on a common diameter, two in each zone, connecting them in a Wheatstone bridge so that their outputs effectively add.

Temperature and hysteresis problems in mounting such strain gages are largely avoided by using a silicon disc as diaphragm and forming the four strain gage elements essentially integrally in or on the diaphragm surface in a manner that provides electrical isolation of the gages from the body of the diaphragm. For example, the diaphragm may comprise a single crystal of silicon of one conductivity type, with the strain gages formed of opposite conductivity type by a diffusion, mesa or epitaxial process in such a way that electrical isolation is achieved by means of a p-n junction. In carrying out such procedures, the diaphragm is ordinarily cut from the silicon single crystal in such orientation with respect to the crystal axes that a direction of maximum longitudinal piezoresistive response lies parallel to the plane of the diaphragm for the conductivity type of which the strain gage elements are to be formed. The four elements are then constructed along a diameter parallel to that direction.

A disadvantage in that conventional procedure is that the strain gage elements are necessarily confined to a relatively small fraction of the diaphragm surface. Especially when the diaphragm diameter must be kept small, it is impractical to provide more than four strain gage elements. The radial length of each element is inherently limited by the radial dimension of the strain zone in which it is placed. Also, the useful transverse dimension of each strain gage element is inherently limited, since its edge prtions have diminished efficiency because they lie in a region where the radial strain forms an appreciable angle with the crystal direction of maximum response. Hence it is difficult to design such strain gage elements so that they combine optimum efficiency of response with adequate area for power dissipation.

The present invention permits more than four strain gage elements to be employed without increase of the diaphragm diameter, thus increasing the potential power dissipation and potentional signal output. Alternatively, the additional strain gage elements made possible by the invention can provide redundant gage elements from which selection may be made for optimizing desirable properties of the finished transducer. For example, in fabricating a silicon diaphragm with integral strain gage elements, the quality of the p-n junction at one or more of the strain gage elements is occasionally inadequate to provide fully satisfactory electrical isolation from the body of the diaphragm. By providing redundant strain gage elements which are essentially equivalent in stress sensitivity, it is usually possible to select four elements which have satisfactory isolation and are suitable for forming a bridge. Such selection leads to economy in manufacture, since many diaphragm structures which might othewise have been scrapped can produce fully satisfactory transducers. If not required for obtaining proper electrical isolation, the redundant strain gage elements permit selection of those that are most closely matched in resistance or other properties, thus facilitating subsequent compensation for temperature changes and the like. The invention further permits, in many instances, construction of two or more complete Wheatstone bridge units on a single diaphragm surface. They can provide redundant electrical data processing channels, or are useful for added system accuracy or for averaging in logic circuits, for example.

Those and other advantages of the invention are provided by orienting the silicon diaphragm or other silicon layer of which the strain gage elements are to be constructed so that it lies in a crystal plane which includes at least two crystal directions of maximum piezoresistive response. It is then possible to form fully effective strain gages along diaphragm diameters parallel to both or all of those crystal directions. That procedure typically results in doubling the number of effective strain gage elements that can be provided, without increase of the diaphragm size, and typically without significant reduction in the size or inherent sensitivity of each element.

FIGS. 1 to 3 represent somewhat schematically an illustrative form of the invention. The circular diaphragm 10 is peripherally supported by the ring structure 20 in a manner that prevents deflection of the annular edge portion 12. As shown, the two ring elements firmly clamp the diaphragm periphery. Such clamping action may be replaced by rigid connection of the diaphragm rim to a stiffening member of any desired type, as by cementing, by integration, or in any suitable manner. The force or pressure to be sensed is produced by means indicated schematically at 26, which may, for example, represent a device responsive to acceleration. The output force from device 26 is applied differentially between the rim and the central portion of the diaphragm, as indicated by the dashed lines 27. Force application to the central region of the diaphragm may utilize the axial post 24, which mechanically contacts a diaphragm face with or without rigid connection to it. Alternatively, device 26 may develop a fluid pressure to be sensed, the force then being applied to the diaphragm by chamber and conduit structure for applying differential fluid pressure to its opposite faces. The present invention concerns the sensing of strain produced in the diaphragm regardless of the manner of force application.

Downward deflection of diaphragm 10 is represented in FIG. 2, the curvature being exaggerated for clarity of illustration. The diaphragm then exhibits concave curvature of the upper diaphragm face in the central zone 27 inside a boundary indicated at 28, which is typically a circle; with convex curvature in the annular zone 29 between that boundary and the restrained rim region 12. The exact form of the diaphragm curvature, and the radius of the locus 28 of zero curvature can be computed in known manner from the form and elastic properties of the diaphragm.

Strain gage elements 30 and 40 are indicated schematically in FIG. 2 in the respective zones 27 and 28. Similar elements are conventionally mounted in symmetrical positions on the other side of the diaphragm center. Those strain gage elements typically comprise silicon of opposite conductivity type from that forming the body of the diaphragm, and may be formed, for example, by localized surface diffusion of suitable doping elements. Strain gage elements so formed are isolated electrically from the diaphragm body by the p-n junctions between the two. Alternatively, the entire surface may be converted from one conductivity type to the other, as by surface diffusion, and the areas not required for the desired strain gage configuration may then be removed, as by localized etching of the surface. Further, a thin layer of crystalline silicon may be applied in any desired manner to a surface of the diaphragm, which may be of silicon or of other material having similar temperature characteristics, with a suitable insulating layer between. When insulation is provided by such a layer, or in other manner that does not require a p-n junction, the conductivity type of the silicon of the body of the diaphragm is typically immaterial.

The several strain gage elements such as 30 and 40 are preferably designed to have approximately equal resistance values, and normally utilize identical patterns. FIG. 3 shows an illustrative resistor pattern for such elements with longitudinal axis 56. Terminal areas are represented at 50 and 52, to which electrical connections can be made in conventional manner. Between terminal areas 50 and 52 there extends a conductive path made up of a plurality of adjacent strips 54 which are substantially parallel to each other and to axis 56. Those strips are interconnected at their ends to form a single series circuit. For some purposes the pattern may be so modified that some or all of such strips are connected in parallel. With axis 56 parallel to a direction of maximum longitudinal piezoresistive response for the material of which strips 54 are composed, the total resistance of the gage element between contacts 50 and 52 respond with good sensitivity to changes of axial strain.

FIG. 1 illustrates a preferred illustrative configuration of strain gage elements in accordance with the present invention. As there shown, disc 10 is cut from a single crystal of silicon in such orientation that the (110) plane of the crystal is parallel to the plane of the disc. The plane of the disc then contains a [110] crystal axis and contains two [111] crystal axes which form equal angles on opposite sides of the [110] axis. All of those axes represent directions of maximum and substantially equal longitudinal piezoresistive response for silicon of p-type. That fact is utilized by the present invention by locating strain gage elements of p-type on disc diameters parallel to all three of those crystal axes.

In the present embodiment, six strain gage elements 30 to 35 are positioned in deflection zone 27, with two on the [110] axis on opposite sides of the center, and two on each of the [111] axes on opposite sides of the center. Six elements 40 to 45 are similarly placed in outer deflection zone 29. The six outer gage elements are shown at equal radii from the center of the diaphragm, selected to coincide with the radius of maximum strain. The inner elements, on the other hand, may be shifted slightly from uniform radius to permit each element to occupy a larger area without overlap. The slight loss of sensitivity that results from such nonuniformity of position is more than made up by maintaining good power dissipating capacity.

The (110) plane represented in FIG. 1 has the further advantage that it contains a [100] axis, which in p-type silicon is a direction of substantially zero longitudinal piezoresistivity. Hence two strain gage elements may be oriented along that axis, as indicated at 47 and 48 in FIG. 1. Such elements, particularly when placed on the locus 28 of zero strain, are substantially nonresponsive to force or pressure application, and may be used for temperature compensation of the transducer output.

FIG. 4 represents another illustrative arrangement of strain gage elements formed in p-type silicon. The crystal from which the elements are formed is there oriented parallel to the (111) plane of the crystalline silicon, which plane contains three [110] directions, all of which are equivalent and exhibit high longitudinal piezoresistive coefficient. As illustrated, three strain gage elements are placed in inner deflection zone 27, one on each of those directions; and three elements are placed in outer deflection zone 29, also one on each of the [110] directions, but on the opposite side of center from the inner zone elements. The arrangement shown permits efficient use of the diaphragm area, particularly when a small diameter is required. The (111) plane also contains three [112] directions which may be utilized to provide additional strain gage elements.

Other crystallographic planes that are useful in connection with the present invention include, for example, the (112) plane, which contains a [111] and a [110] axis at right angles to each other, as well as two [012] axes, all providing good piezoresistive response in p-type silicon (FIG. 5); and the (100) plane, which not only contains two mutually perpendicular [110] directions, which are useful in p-type silicon (FIG. 6), but also contains two mutually perpendicular [100] axes, which have good sensitivity in n-type silicon (FIG. 7). Those illustrative selections are all useful in carrying out the invention, and are representative of its wide potential scope.

I claim:

1. A transducer comprising the combination of:
    a generally flat and circular diaphragm capable of flexing in response to transverse force application, structure rigidly supporting the diaphragm peripherally, means for applying force transversely to a central portion of the diaphragm to deflect the same and thereby produce inner and outer concentric zones of oppositely directed strain, a plurality of piezoresistive strain gage elements all formed of a common single crystal layer of silicon of a selected conductivity type carried by one face of the membrane and electrically isolated therefrom, each strain gage element comprising a plurality of mutually adjacent strips extending approximately radially within one of said zones and interconnected electrically to form a single electrical element for current flow between two terminal areas, said single crystal layer having its crystal axes so oriented that the plane of the layer includes at least two nonparallel directional axes of maximum longitudinal piezoresistivity of the same sign and approximately equivalent magnitude, and said plurality of strain gage elements including at least one element having its strips substantially alined with each of said directional axes and including more than two elements in each of said zones, and circuit means, including electrical connections to the terminal areas of two selected elements in each of said zones, for forming a Wheatstone bridge circuit with the two elements in each zone connected in opposite arms of the bridge.

2. A transducer as defined in claim 1, and in which: said diaphragm comprises a single crystal, and said crystal layer is a surface layer of that single crystal, the strain gage elements being electrically isolated from the body of the single crystal by p-n junctions.

3. A transducer as defined in claim 1, and in which: said silicon layer is of p-type silicon, and the plane of the layer is parallel to a (110) crystal plane and contains a [110] crystal axis and two [111] crystal axes, said plurality of strain gage elements including at least two elements aligned with each of said crystal axes.

4. A transducer as defined in claim 1, and in which: said silicon layer is of p-type silicon, and the plane of the layer is parallel to a (111) crystal plane and contains three [110] crystal axes, said plurality of strain gage elements including at least two elements aligned with each of said crystal axes.

5. A transducer as defined in claim 1, and in which: said silicon layer is of p-type silicon, and the plane of the layer is parallel to a (112) crystal plane and contains a [110] crystal axis, a [111] crystal axis and two [012] crystal axes.

6. A transducer as defined in claim 1, and in which: said silicon layer is of p-type silicon, and the plane of the layer is parallel to a (100) crystal plane and contains two [110] crystal axes.

7. A transducer as defined in claim 1, and in which: said silicon layer is of n-type silicon, and the plane of the layer is parallel to a (100) crystal plane and contains two [100] crystal axes.

References Cited
UNITED STATES PATENTS

| | | |
|---|---|---|
| 2,963,911 | 12/1960 | Courtney-Pratt et al. |
| 3,196,668 | 7/1965 | McLellan. |
| 3,251,222 | 5/1966 | Fenner. |
| 3,292,128 | 12/1966 | Hall. |

REUBEN EPSTEIN, Primary Examiner

U.S. Cl. X.R.

73—88.5, 141; 338—4